March 18, 1969  R. P. ROBERTS  3,433,477
CONVERTIBLE VAULTING PIECE AND INCLINED PLANE
Filed Feb. 27, 1967
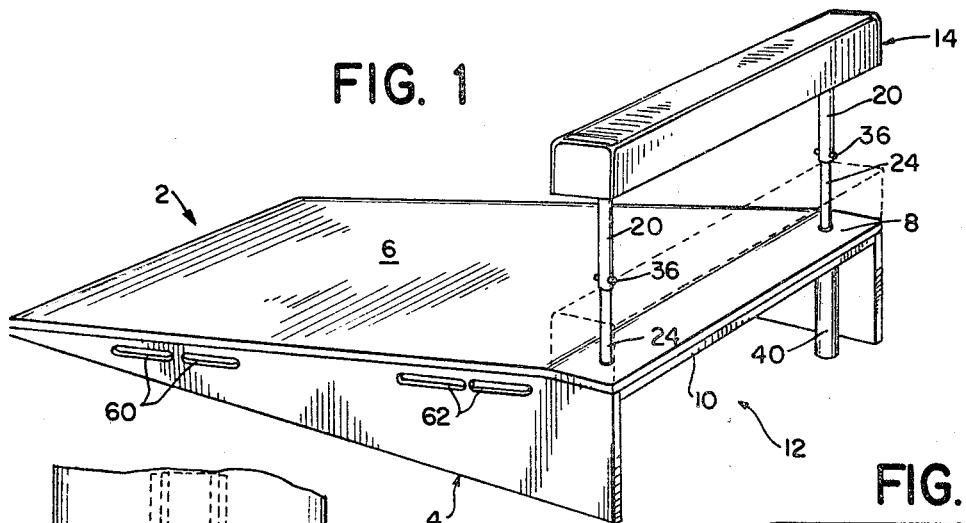
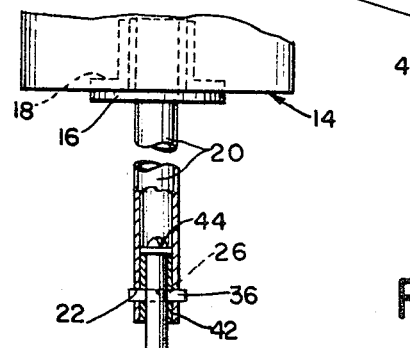
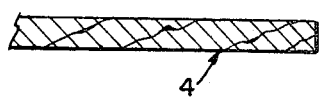
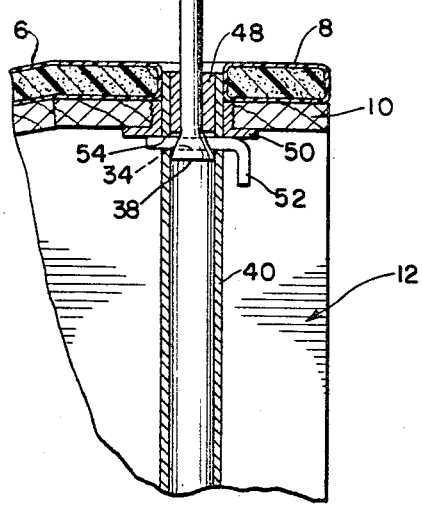
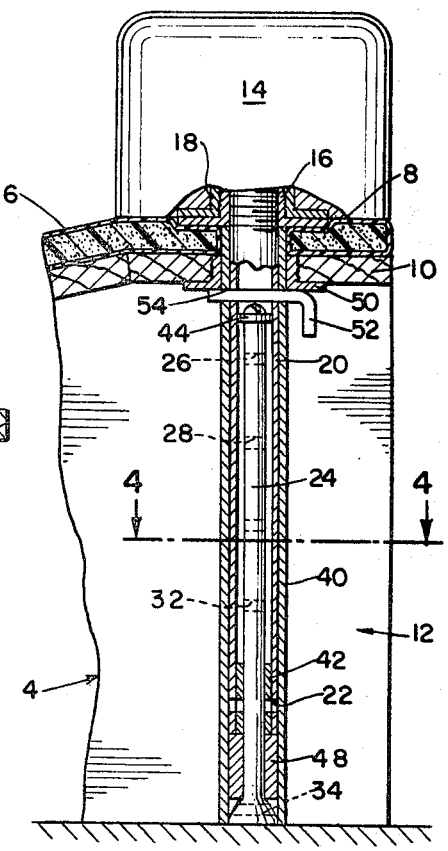
INVENTOR
RODMAN P. ROBERTS
BY *James F. Hoode*
ATTORNEY United States Patent Office 3,433,477
Patented Mar. 18, 1969

3,433,477
CONVERTIBLE VAULTING PIECE AND INCLINED PLANE
Rodman P. Roberts, Glen Cove, N.Y.
(6315 Brightlea Drive, Lanham, Md. 20801)
Filed Feb. 27, 1967, Ser. No. 618,587
U.S. Cl. 272—64
Int. Cl. A63b 5/12, 23/00
5 Claims

ABSTRACT OF THE DISCLOSURE

A convertible gymnastic training aid which can serve in one position as an aid in forward and backward roll, roundoff, back extension roll and back handspring training in a second position as an aid in head and hand spring, front and back somersault training and in a third position as an aid for vaults such as the flank vault, the squat stand and vault, the straddle stand and vault and many other vaults. The invention in a preferred embodiment comprises an inclined padded plane at the top of which is provided a padded horizontal vaulting piece affixed to the inclined plane by a height adjustable and removable assembly. Thus the apparatus can be converted to an inclined plane, to an inclined plane provided with a padded vaulting piece at its higher end in abutting relationship with the inclined plane and to an inclined plane provided with a raised vaulting piece at its higher end. The various positions are dictated by the stunt or exercise being taught or performed.

BACKGROUND OF THE INVENTION

Field of the invention

The instant invention resides in the field of gymnastic training aids. More specifically, this invention resides in the field of teaching aids for rolls, somersaults, head and hand springs, vaults and the like.

Discussion of the prior art

Heretofore, the training of youngsters, particularly those in the pre-school age group up to about grade 6, had to be performed on either normal gymnastic floor pads, in the case of the roll and somersault for instance, or on ordinary size gymnastic padded horses in the case of the vault. It will be appreciated that neither of these devices aid the youngster in the physical movement necessary for the exercise. Hence, they are merely passive, and present some fear thereby inhibiting the youngster and making the teaching task even more difficult. This is particularly true in the case of the gymnastic horse. Hence, it has become very desirable to provide an exercise training aid which does not inhibit the child and which helps him learn the basic movements entailed in the exercise. It is still more desirable to provide such training aid which can serve in the teaching of substantially all of the basic gymnastic exercises. It is still even more desirable to provide such an apparatus which can be constructed at a nominal cost from readily available material within a reasonable period of time and which is structurally safe for the uses intended.

OBJECTS OF THE INVENTION

It is an object of this invention, therefore, to provide a gymnastic training aid for youngsters particularly those in the age group of pre-school to about grade school.

It is still another object of this invention, therefore, to provide a gymnastic training aid which facilitates the basic gymnastic exercises by acquainting the child with the physical movements involved by the action of momentum and gravity.

It is still another object of this invention, therefore, to provide such a gymnastic training aid which alleviates the normal childhood inhibitions concerning a gymnastic stunt never before performed by the child.

It is yet another object of this invention, therefore, to provide such gymnastic training aid which is structurally sound and safe, is easily constructed, is readily convertible for many of the basic gymnastic exercises and which can be readily constructed of inexpensive materials.

These and other objects and advantages of my invention will become apparent from the following complete description, accompanying drawing and appended claims.

STATEMENT OF THE INVENTION

Broadly, this invention contemplates a gymnastic training aid which comprises a support, an inclined planar surface on said support, a vaulting piece affixed to said support at its higher end by height adjustable vertical support, said vertical support and said vaulting piece being securely detachably removable from said support.

In a particularly desirable embodiment, this invention contemplates a gymnastic training aid comprising a support, an inclined planar padded surface on said support, a padded vaulting piece affixed securely detachably removable to said support at its higher end by a pair of height adjustable vertical support means securely detachably removably affixed to said padded vaulting piece, one of said vertical supports positioned on one side of said vaulting piece and the other of said supports positioned on the other side of said vaulting piece.

In a still more desirable embodiment each vertical support comprises a hollow rod with at least one vertically spaced slot therethrough said hollow rod adaptable to receive another rod having vertically spaced slots therethrough adaptable to be in registry with a slot in the hollow rod to receive a pin both of said rods adaptable when in inwardly telescoped position to be accommodated in a stationary rod in said support.

BRIEF DESCRIPTION OF THE DRAWINGS

The instant invention can be more readily understood and appreciated by reference to the accompanying drawings in which:

FIGURE 1 is a perspective view, partly in phantom, showing the gymnastic training aid of my invention.

FIGURE 2 is a partial side elevation of the gymnastic training aid of my invention, partially broken away.

FIGURE 3 is a partial side elevation of the gymnastic training aid of my invention, similar to FIGURE 2 but showing the vertical support rods collapsed or telescoped inwardly.

FIGURE 4 is a sectional elevation taken along the line 4—4 of FIGURE 3.

DESCRIPTION OF PREFERRED EMBODIMENT

A preferred embodiment of my invention is shown in the accompanying drawing in which the gymnastic training aid is generally designated by reference numeral 2. It comprises a support generally represented by numeral 4. Support 4 has the general configuration of an inclined plane. On support 4 there is rigidly affixed thereto as by suitable fasteners an inclined planar surface 6 leveling off to level padded surface 8 which is affixed to a support beam 10. Support 4 is provided with 2 pair of hand holes on each side to facilitate moving the apparatus if necessary. The end of the support 4 i.e. the portion below support beam 10 at the higher end of the inclined plane is open at 12, although, if desired, a facing sheet can be mounted with suitable openings to permit access to the device.

A padded vaulting piece 14 having rounded corners is affixed to hollow rod 20 employing a threaded flange 16 engaging a reciprocally threaded flange 18 in padded vaulting piece 14. Hollow rod 20 is provided with at least one vertically spaced horizontally extending slot 22. A height adjusting rod 24 having a diameter less than that of rod 20 is positioned partially within rod 20. It is provided with several vertically spaced horizontally extending slot 26, 28, 30, 32 and 34, all of which are adaptable to be in registry with slot 22 so that pin 36 can pass through the rods when in alignment. Slot 26 is at the uppermost extremity of rod 24 while slot 34 is at the lowermost extremity just above the point 38 where rod 24 tapers outward to meet stationary support rod 40 which functions as a cylindrical housing for accommodation of rods 20 and 24 when in collapsed position as shown in FIGURE 3.

Rod 24 is tightly held within rod 20 when in extended position as shown in FIGURE 2 employing bushing 42 and end washer 44. Rod 24 is held rigidly within rod 40 by the action of bushing 48. Rod 40 is affixed rigidly to beam 10 by the same type of coacting threaded flanges employed for the vault piece 14. Flange 50 affixed to rod 40 engages threads (not shown) on beam 10. A height sustaining pin 52 is positioned under beam 10 and padded level 8 and is adaptable to pass through a slot 54 on opposite sides of rod 40 when slot 34 is aligned in registry. Thus the raised position shown in FIGURE 2 is provided in the manner discussed. The entire vertical support assembly can be collapsed or inwardly telescoped by removing pin 36 thereby lowering vaulting piece 14 and by removing pin 52 permitting the rods to collapse within rod 40 but in rigid position with the vaulting piece 14 abutting level 8. Generally the length of rod 24 is less than the length of hollow rod 20 and both have a length less than housing rod 40 as seen in FIGURE 3. Two pair of hand grips 60 and 62 are provided on the support on both sides of the inclined plane.

The use of my invention is very simple. The vertical support means is withdrawn from housing rod 40 carrying with it vaulting piece 14 thereby leaving an inclined plane. This position enables teaching forward and backward rolls, cartwheels, roundoffs and the like. The gravity and momentum encountered when the child goes down the inclined plane assist the child in completing the exercise and in addition, assisting teaching him the body movement necessary to complete the stunt. When the child is taught handstands and/or headstands, the vertical support assembly is reinserted into the housing rod 40 in the phantom position shown in FIGURE 1. The forward headstand, for instance, is performed by having the child run up the inclined plane, place his hands and head on the padded vaulting piece and go feet over head off the assembly into the hands of the instructor or onto a standard padded gymnastic exercise mat. In this case just the sufficient amount of momentum is provided so that the child can perform the required physical acts within the alotted time and complete the exercise in perfect form. Front and back somersaults can also be performed using this position of the gymnastic training device. When vaulting is to be taught, the vaulting piece is raised from abutting position by removing pin 52, raising rods 20 and 24 and inserting pin 36 through slot 22 when in alignment with a desired slot on rod 24 i.e. slot 26, 28, 30, 32 or 38 as shown in FIGURE 2 and reinserting in 52.

It should be apparent that the above specifically described and illustrated gymnastic training devices is a preferred embodiment but the other systems using vertical supports inclined planes and padded vaulting pieces can be employed. For instance, insead of employing a telescoping mechanism one can use a series of pipes threaded at both ends and varying in height. One threaded end engages the padded vaulting piece and the other engages a reciprocally threaded member on the support. The rods vary in height to provide for the different height requirements imposed by the stunts being taught.

Hence, it is readily seen that my inclined gymnastic training device facilitates teaching younger children gymnastic tumbling and vaulting movements safely and earlier in life. The movement is basic motor skill that covers extensively the mechanics of rolling, turning, springing, and twisting and provides a fine background or lead up training for more difficult competitive apparatus, as well as carry-over activity for other sports. The training devices develop coordination, timing, agility, flexibility, strength and power in the large muscle group, courage and confidence. It substantially lessens inhibition in the child particularly in the case of vaulting.

The terms and expressions used herein have been used for purposes of illustrating the invention and not for purposes of limiting the same as there may be various modifications and departures from the above disclosure within the spirit and scope of the invention claimed.

I claim:
1. A gymnastic training aid comprising a support, an inclined planar surface on said support, a vaulting piece affixed to said support at its higher end by a height adjustable vertical support, said vertical support being secured detachably removable from said support.

2. A gymnastic training aid according to claim 1 wherein said planar surface and said vaulting piece are padded, and a second height adjustable support affixed to said vaulting piece and securely detachably removable from said support.

3. A gymnastic training aid according to claim 2 wherein one of said vertical supports is positioned on one end of said vaulting piece and the other of said supports is positioned on the other end of said vaulting piece.

4. A gymnastic training aid according to claim 2 wherein at least one of said vertical supports comprises a hollow rod with at least one vertically spaced slot therethrough adaptable to engage a telescoping rod and to accommodate said rod, said telescoping rod having horizontally extending vertically spaced slots therethrough adaptable to be in registry with a slot in the hollow rod and to receive a pin, both of said rods adaptable when in inwardly telescoped position to be accommodated in a stationary rod in said support.

5. A gymnastic training aid according to claim 4 wherein said stationary rod is provided with a horizontally extending slot proximates said inclined plane and a pin passes through said slot and a slot in said telescoping rod to maintain said vaulting piece in elevated position.

References Cited
UNITED STATES PATENTS

| | | | |
|---|---|---|---|
| 2,475,289 | 7/1949 | MacGregor | 272—58 |
| 2,264,046 | 11/1941 | McClellan | 272—58 |
| 2,919,918 | 1/1960 | Horn | 272—60 |

RICHARD C. PINKHAM, Primary Examiner.

RICHARD W. DIAZ, JR., Assistant Examiner.

U.S. Cl. X.R.
272—58, 60